United States Patent
Kundu et al.

(10) Patent No.: US 10,333,917 B2
(45) Date of Patent: Jun. 25, 2019

(54) CONTROLLING ACCESS TO ELECTRONIC RESOURCES BASED ON A USER'S SOCIOMETRIC IDENTIFICATION DOCUMENT

(71) Applicant: International Business Machines Corporation, Armonk, NY (US)

(72) Inventors: Ashish Kundu, Elmsford, NY (US); Nalini K. Ratha, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 15/397,885

(22) Filed: Jan. 4, 2017

(65) Prior Publication Data

US 2018/0191698 A1    Jul. 5, 2018

(51) Int. Cl.
| H04L 29/06 | (2006.01) |
| H04L 29/08 | (2006.01) |
| G06Q 50/00 | (2012.01) |
| G06Q 30/02 | (2012.01) |

(52) U.S. Cl.
CPC ......... *H04L 63/08* (2013.01); *G06Q 30/0241* (2013.01); *G06Q 30/0269* (2013.01); *G06Q 50/01* (2013.01); *H04L 63/102* (2013.01); *H04L 67/12* (2013.01); *H04L 67/141* (2013.01); *H04L 67/146* (2013.01); *H04L 67/306* (2013.01)

(58) Field of Classification Search
CPC ....... H04L 63/08; H04L 67/12; H04L 67/141; H04L 67/146; H04L 67/306; G06F 21/30; G06F 21/31

USPC .............................................. 726/2–7, 27–30
See application file for complete search history.

(56) References Cited

U.S. PATENT DOCUMENTS

| 7,389,917 | B2 | 6/2008 | Abraham et al. |
| 7,792,903 | B2 | 9/2010 | Fischer et al. |
| 8,291,477 | B2 * | 10/2012 | Lunt ...................... H04L 51/12 726/4 |
| 8,468,103 | B2 * | 6/2013 | Galbreath .............. G06Q 30/02 705/319 |

(Continued)

FOREIGN PATENT DOCUMENTS

WO    2016033356 A1    3/2016

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Hosuk Song
(74) *Attorney, Agent, or Firm* — Law Office of Jim Boice

(57) ABSTRACT

A method establishes a session between a network resource and a user device used by a user having a particular sociometric identity. One or more processors identify an interaction between a user and one or more provider entities. The processor(s) identify profiles for the one or more provider entities, and compute a sociometric identity of the user based on the profiles of the one or more provider entities with which the user has had an interaction. One or more processors transmit the sociometric identity to a network resource in order to establish a session between the network resource and a user device used by the user having the sociometric identity.

20 Claims, 13 Drawing Sheets

(56) References Cited

U.S. PATENT DOCUMENTS

| | | | | |
|---|---|---|---|---|
| 8,819,851 | B1* | 8/2014 | Johansson | H04L 63/0428 726/28 |
| 8,904,480 | B2* | 12/2014 | Castro | G06F 21/40 726/2 |
| 8,918,904 | B2* | 12/2014 | Sanin | H04L 51/32 705/38 |
| 9,015,248 | B2 | 4/2015 | Barreto et al. | |
| 9,948,730 | B2* | 4/2018 | Rubio | H04L 63/102 |
| 2004/0221171 | A1 | 11/2004 | Ahmed et al. | |
| 2015/0264023 | A1 | 9/2015 | Reno | |
| 2016/0080944 | A1 | 3/2016 | Colegate et al. | |

OTHER PUBLICATIONS

M. Sultana et al., "Online User Interaction Traits in Web-Based Social Biometrics", Computer Vision and Image Processing in Intelligent Systems and Multimedia Technologies, Chapter:9, Publisher: IGI Global, Apr. 2014, pp. 177-190.

A. Keromytis, "Active Authentication", <www.darpa.mil/program/active-authentication>, retrieved Oct. 13, 2016, pp. 1-3.

R. Yampolskiy, "Human Computer Interaction Based Intrusion Detection", IEEE, International Conference on Information Technology—New Generations, 2007, pp. 1-6.

H. Gamboa et al., "Webbiometrics: User Verification Via Web Interaction", IEEE, Biometrics Symposium, 2007, pp. 1-6.

Y. Amichai-Hamburger et al., "Social Network Use and Personality", Elsevier, Ltd., Computers in Human Behavior 26, 2010, pp. 1289-1295.

E. Lanza et al., "Tell Me Who Your Friends Are and I Might Be Able to Tell you What Language(s) You Speak: Social Network Analysis, Multilingualism, and Identity", Kingston Press Ltd., International Journal of Bilingualism, vol. 11, No. 3, pp. 275-300.

D. Mashima et al., "Towards a User-Centric Identity-Usage Monitoring System", IEEE, The Third International Conference on Internet Monitoring and Protection, 2008, pp. 47-52.

N. Geslevich-Packin et al., "On Social Credit and the Right to be Unnetworked", Columbia University, Columbia Business Law Review 339, 2016, pp. 1-63.

* cited by examiner

CONTROLLING ACCESS TO ELECTRONIC RESOURCES BASED ON A USER'S SOCIOMETRIC IDENTIFICATION DOCUMENT

BACKGROUND

The present disclosure relates to the field of computers, and particularly to computers that communicate via a network. More particularly, the present disclosure relates to authentication of computers that communicate via a network.

Computer resources include hardware (e.g., servers, storage devices, printers, etc.) as well as software (e.g., applications, databases, etc.). Such computer resources may be on a network, thus allowing remote access by a user, or local, such that the user is able to directly access the computer resources.

In order to access such computer resources, the user is often required to identify himself/herself, in order to allow the system to keep a record of which user accesses the computer resources, to ensure that only authorized users are accessing the computer resources, to challenge the user (e.g., for security purposes), etc.

However, if the user simply identifies himself/herself with a name (e.g., a given name, a name of an email address, etc.), then there is little security. That is, it is a trivial process for an unauthorized/improper user to simply lie about his/her name when accessing such computer resources. Therefore, various types of security measures can be taken.

For example, the user may be required to identify himself/herself with a password or token. But a password or token is may be easy for the user to forget, and for improper parties to steal.

The user may be required to identify himself/herself by presenting a biometric signature (e.g., a fingerprint, retina scan, etc.), but this requires additional hardware (biometric scanners).

The user may be associated with the computer from which he/she is working (e.g., as identified by an internet protocol (IP) address or a media access control (MAC) address or a universal unique identifier (UUID) for that computer). However, this only identifies the computer, not the user.

Thus, the prior art does not truly identify "who" the user is. Rather, the "identity" of the user in the prior art is based on the user's given name, the user's password, the user's biometrics, or the user's computer. None of these items provide a true identity of the user, particularly when accessing various computer resources.

SUMMARY

In one or more embodiments of the present invention, a method establishes a session between a network resource and a user device used by the user having a particular sociometric identity. One or more processors identify an interaction between a user and one or more provider entities. The processor(s) identify profiles for the one or more provider entities, and compute a sociometric identity of the user based on the profiles of the one or more provider entities with which the user has had an interaction. One or more processors transmit the sociometric identity to a network resource in order to establish a session between the network resource and a user device used by the user having the sociometric identity.

In one or more embodiments of the present invention, the method is implemented as a computer program product and/or in a system.

In an embodiment of the present invention, a time period in which the interaction between the user and the one or more provider entities occurs is used to limit a lifetime of the sociometric identity.

In an embodiment of the present invention, one or more processors recursively examine the profiles for the one or more provider entities until the sociometric identifier is confirmed for the user.

In an embodiment of the present invention, one or more processors construct a social graph that includes a user node for the user linked to provider entity nodes for the one or more provider entities. The user node and the one or more provider entity nodes are connected by pairs of static edges and dynamic edges, where the static edges include static metadata that describes a relationship between the user node and the one or more provider entity nodes, and where the dynamic edges include dynamic metadata that describes actions and interactions between the user and the one or more provider entities. One or more processors perform a depth-first search of the social graph in order to traverse all nodes in the social graph, and then hash the sociometric identity with the static metadata and the dynamic metadata for all nodes in order to create a sociometric identity hash value, and then store the sociometric identity of the user at a location, in a sociometric identity table, that is identified by the hash value.

In an embodiment of the present invention, one or more processors construct a social graph that includes a user node for the user linked to provider entity nodes for the one or more provider entities. The user node and the provider entity nodes are connected by pairs of static edges and dynamic edges, where the static edges include static metadata that describes a relationship between the user node and the provider entity nodes, and where the dynamic edges include dynamic metadata that describes actions and interactions between the user and the one or more provider entities. One or more processors partition the social graph into multiple digests, including a first digest that is composed of the user node and a first set of provider entity nodes, and a second digest that is composed of the user node and a second set of provider entity nodes. One or more processors compare the first digest to the second digest in order to determine a percentage of matching static and dynamic metadata between the first digest and the second digest. In response to the percentage of matching static and dynamic metadata between the first digest and the second digest exceeding a predefined value, one or more processors confirm the sociometric identity of the user as a confirmed sociometric identity. One or more processors then store the confirmed sociometric identity in a digest store, where the digest store uses a key value pair table that associates the sociometric identity of the user with the first digest.

DETAILED DESCRIPTION

Figure 1:
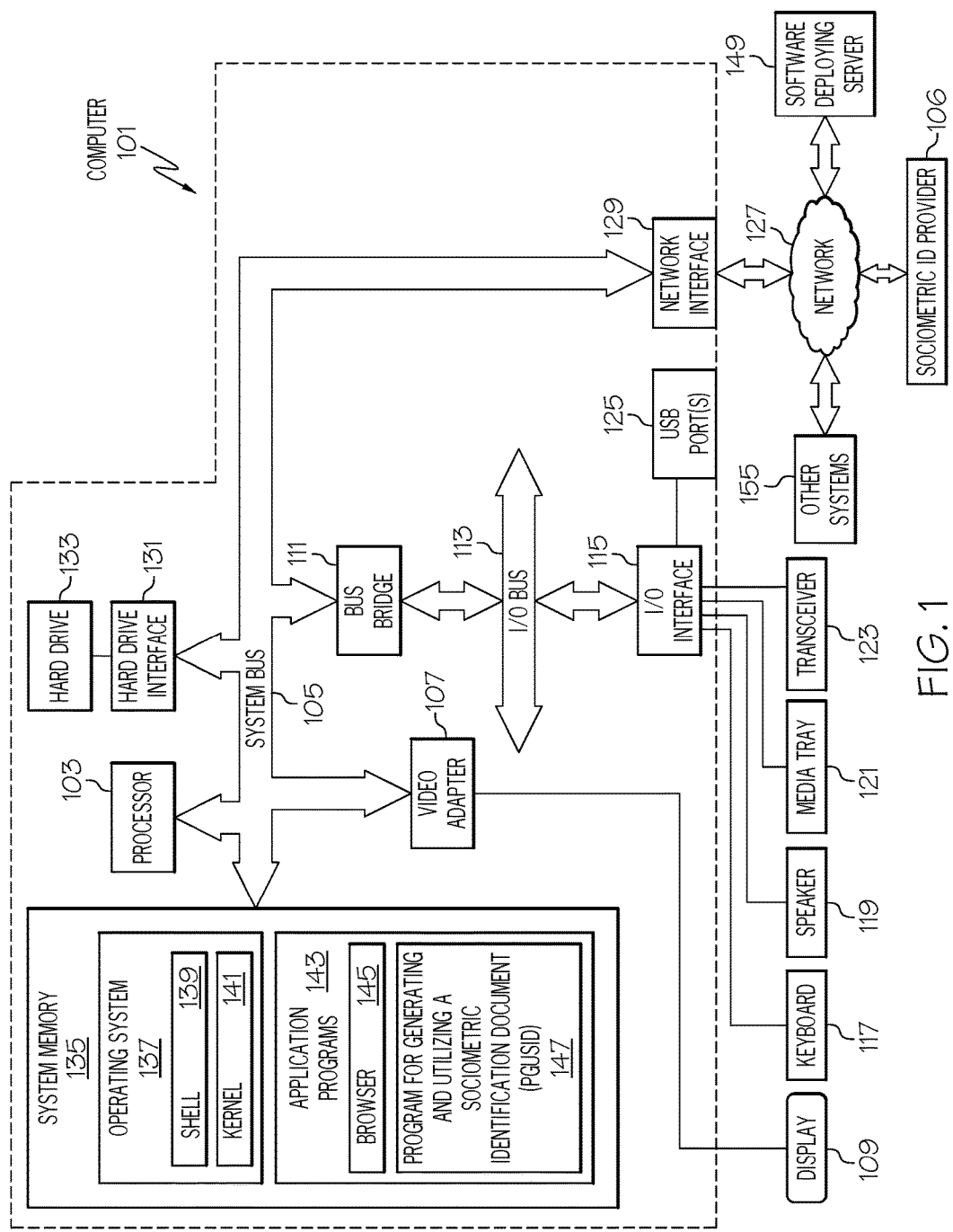
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by sociometric ID provider 106 and/or software deploying server 149 and/or other systems 155 shown in FIG. 1.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Generating and Utilizing a Sociometric Identification Document (PGUSID) 147. PGUSID 147 includes code for implementing the processes described below, including those described in FIGS. 2-11. In one embodiment, computer 101 is able to download PGUSID 147 from software deploying server 149, including in an on-demand basis, wherein the code in PGUSID 147 is not downloaded until needed for execution. In one embodiment of the present invention, software deploying server 149 performs all of the functions associated with the present invention (including execution of PGUSID 147), thus freeing computer 101 from having to use its own internal computing resources to execute PGUSID 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

As used herein, the terms "ID" and/or "identification document" are defined as an electronic document that identifies a particular user. The term "sociometric ID" is defined as an ID that identifies a particular user according to the activities and interactions of that user as described herein.

As described herein, the sociometric ID is not based on what a person has or what the person's name is or what the person's password is, but rather is based on what the person does and/or has done. That is, the sociometric ID identifies the person based on what he/she does, which provides a true identification of who the person really is. This "true identity" is difficult, if not impossible, to fake, thus leading to a sociometric ID that is more trustworthy than a name, password, etc.

Figure 2:
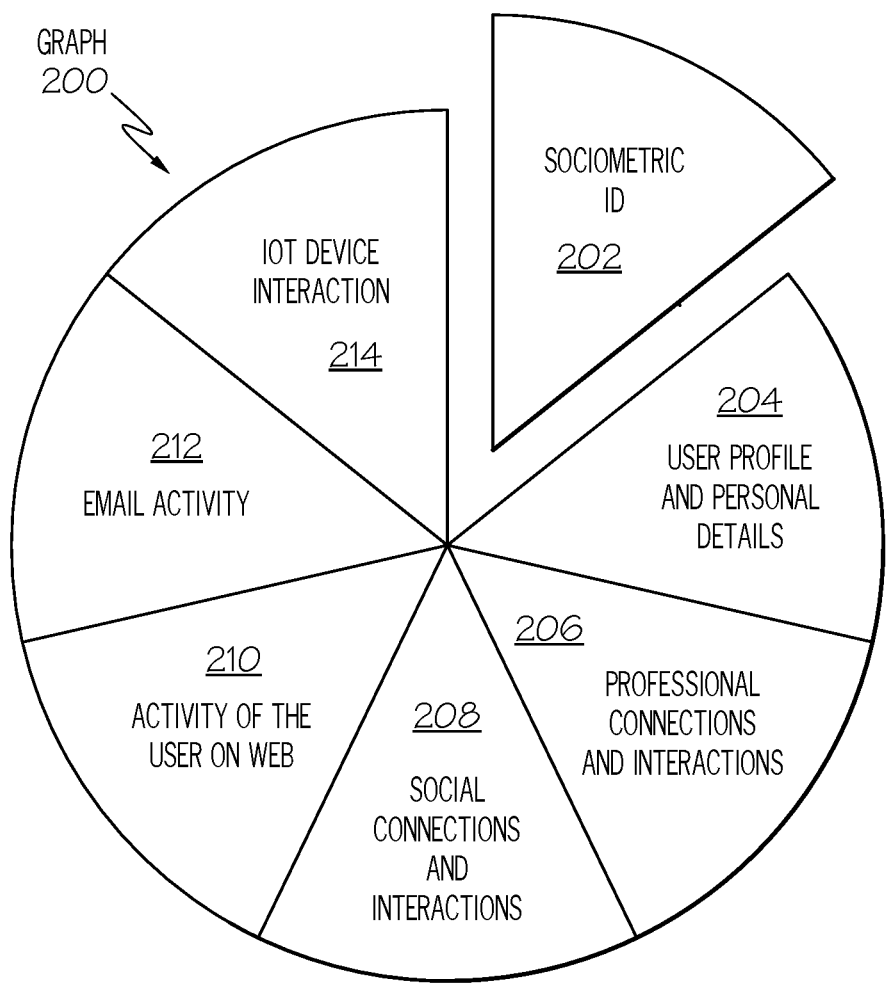
FIG. 2 illustrates a graph showing a relationship between a sociometric identity that is defined by various user interactions and/or activities in accordance with one or more embodiments of the present invention.

With reference now to FIG. 2, an exemplary graph 200 shows a relationship between a sociometric identification document (sociometric ID) (depicted in block 202) that is defined from the user's profile in combination with the user's various user interactions and/or activities (in accordance with one or more embodiments of the present invention). That is, the novel sociometric ID in graph 200 is derived from a combination of the user's profile and personal details (depicted in block 204), such as a particular user's name, education, stated interests, etc. with that user's interactions with various provider entities.

For example, the user may have a history of professional connections and interactions (block 206). That is, the user may be on a social media website that is tailored to a particular occupation, or the user may be a member of a professional organization for a specific occupation. The provider entity is thus the social media service and/or organization that provide such memberships and interactions.

Furthermore, the user may have a history of social connections and interactions (block 208). That is, the user may be on a social media website that is tailored to persons having similar interests or persons who simply want to be part of an on-line community of persons having varied interests, backgrounds, etc. The provider entity in this example is thus the social media service that supports such social media websites.

Furthermore, the user may have a history of activity on the Internet (i.e., a Browser history) that shows which websites the user has visited online, as shown in block 210.

Furthermore, the user may have a history of certain email activity (block 212). That is, the user may have an email history of email having a certain subject line, being exchanged with certain persons, being sent at certain times of the day, etc.

Furthermore, the user may have a history of interacting with an Internet of Things (IoT) devices (block 214), such as other systems 155 shown in FIG. 1. That is, the user may use a computer (e.g., computer 101 shown in FIG. 1) that interacts with devices that are equipped with monitoring sensors, etc. (e.g., other systems 155 shown in FIG. 1), thus providing a fabric of devices that communicate with one another.

Thus, the sociometric ID shown in block 202 in graph 200 is the result of a particular user engaging in one or more of the activities and/or interactions shown in graph 200. That is, the present invention generates a unique sociometric ID for a particular user based on what that user does, rather than that person's physical traits (biometrics), what that person has (e.g., is using a particular system, dongle, etc.), or what that person knows (e.g., a password). Rather, that person/user is given an identity that is based on what that person has done (activities/interactions) with the provider entities that are associated with activities/interactions described in blocks 206-214.

In one or more embodiments of the present invention, the sociometric ID is dependent upon a frequency of interaction/activities. For example, if a first user connects to a particular social media website once an hour, while another user connects to (the same or different) social media website once a month, this disparity in frequency is used to assign different sociometric IDs to the first user and the second user.

In one or more embodiments of the present invention, the derivation of the sociometric ID is an evolving dynamic activity rather than a static action. That is, rather than assigning a user a particular sociometric ID at a fixed point in time (based on activities and interactions up to that point in time), in one or more embodiments of the present invention the sociometric ID is periodically and/or continuously updated, in order to refine the sociometric ID. For example, assume that an initial sociometric ID is created for a user based on that user accessing his/her social media webpage once a month. However, after that initial sociometric ID is created, assume that this same user has been exchanging daily emails with an entity from another social media website for a year, and no longer is visiting the social media webpage. As such, the sociometric ID will be updated to show that this user is no longer identified as a person who uses the social media webpage, and is now engaged in a relationship with the entity from the other social media webpage.

In one or more embodiments of the present invention, there are mutually dependent sociometric IDs. For example, assume that user A and user B are exchanging daily emails. As such, the sociometric IDs will be initially created and/or updated for both user A and user B based on this interaction.

Figure 3:
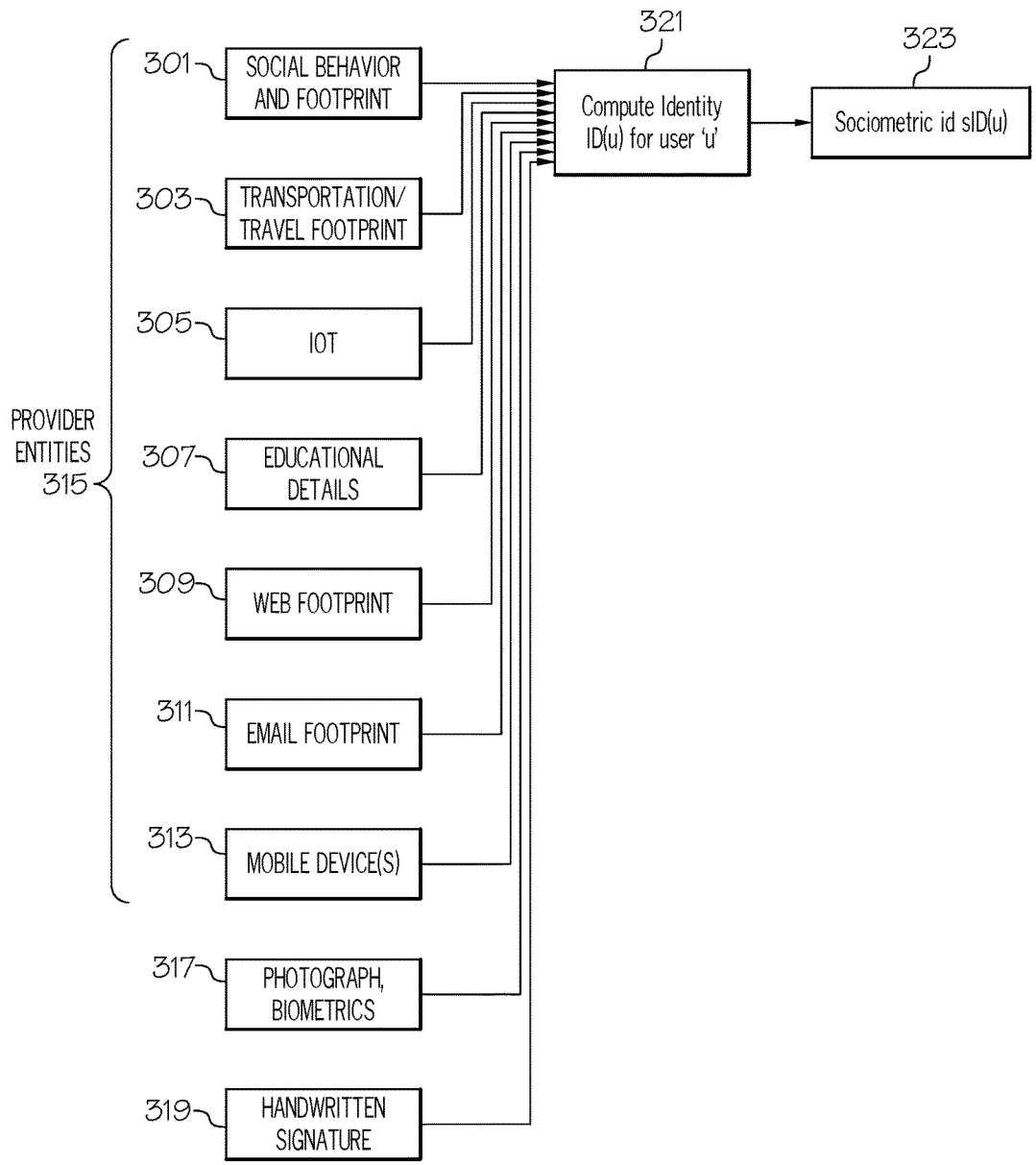
FIG. 3 depicts an exemplary set of activities, interactions, histories, profiles, and/or devices provided by provider entities in order to supply information used to compute a sociometric ID for a user in accordance with one or more embodiments of the present invention.

With reference now to FIG. 3, an exemplary set of activities, interactions, histories, profiles, and/or devices provided by provider entities in order to supply information used to compute a sociometric ID for a user in accordance with one or more embodiments of the present invention is presented.

For example, as shown in block 301, the user's social behavior and footprint may be captured. Some of this behavior and footprint is captured from social media websites, which may be profession-based or purely social-based. This social behavior may also be inferred by the user's membership in certain organizations (e.g., membership in a sailing club indicates that the user is a sailor). The social footprint may also be derived from social activities (e.g., attending a swim meet), authorship (e.g., publishing a paper on a certain topic or having a web log (blog) devoted to a certain topic), etc. Thus, the social network is the provider entity that provides sociometric information about the user.

As shown in block 303, the user's transportation/travel footprint may be captured. For example, the type of air and public travel taken by the user may be captured from a carrier reservation system. Similarly, pedestrian routes taken by the user can be captured from a positioning system (e.g., a global positioning system—GPS) within a smartphone carried by the user while walking to work, running on a trail, etc. These records may be of places, times, durations, etc. of the travel taken by the user. Thus, the carrier reservation system and/or GPS system in the smartphone are the provider entity that provides sociometric information about the user.

As shown in block 305, sensors on various devices may capture data about the devices and their environment, which are then shared by and among the devices. That is, these devices are able to communicate their activities and states with one another, and are known collectively as an Internet of Things (IoT). For example, assume that a user has a truck and a chainsaw (as identified by universally unique identifier (UUID) chips on each of the truck and chainsaw). Each of the truck and the chainsaw has a sensor and communication system (e.g., a cellular transceiver). Assume further that a sensor on the chainsaw shows that the chainsaw has been used to cut up trees/branches (and when). Positioning sensors on the truck show that after the user has used the chainsaw to cut up the trees/branches, he/she drives the truck to a recycling center, and unloads the trees/branches into a chipper (which also has sensors/transceivers and is also part of the IoT). This combination of information from the IoT is used to identify the user as a person who 1) handles his/her own major landscaping maintenance and 2) is environmentally conscious, in order to develop his/her sociometric identity. Thus, the IoT is the provider entity that provides sociometric information about the user.

As shown in block 307, educational details about the user are supplied by a server operated by an educational entity (high school, university, trade school, etc.), to include grade transcripts, certifications, diplomas, etc. earned by a user. Thus, this education entity is the provider entity that provides sociometric information about the user.

As shown in block 309, a web footprint shows which websites have been visited by the user, how frequently each website is visited by the user, and what time of the day/week/month/year each website is visited by the user. This information is maintained by a browser that is used by the user. Thus, this browser (and/or the webpage server) is the provider entity that provides sociometric information about the user.

As shown in block 311, an email footprint shows a history of emails, to whom they are received and sent, how frequently they are sent/received generally (to and from any party) or specifically (to and from a particular entity), the subjects of the emails, what time of the day/week/month/year each email is exchanged, etc. This information is maintained by an email program that is used by the user. Thus, this email program (and/or the email server) is the provider entity that provides sociometric information about the user.

As shown in block 313, what mobile devices are used by a user and how they are used provides additional information about the user. For example, assume that the user has a smartphone and a tablet computer. The applications loaded on such devices, how the user utilizes them (e.g., how often and for what purpose), where the devices are used, etc. provide additional sociometric information about the user. Thus, these mobile device(s) define the provider entity that provides sociometric information about the user.

Collectively, elements 301-313 shown in FIG. 3 are exemplary provider entities 315. However, in order to create the sociometric ID for the user in one or more embodiments of the present invention, other information is also incorporated into the sociometric ID. For example, the sociometric ID may include a photograph, biometric sensor readings, etc. of the user (block 317), a name, handwritten signature, etc. of the user (block 319), etc.

As shown in FIG. 3, some or all of the information described for blocks 301-319 are then incorporated into a computer (e.g., computer 101 shown in FIG. 1), which computes a preliminary ID (ID(u) for user 'u') for the user (e.g., using information from blocks 317-319), as shown in block 321. The system then augments/refines this preliminary ID using the information from the provider entities described with blocks 301-315 to create the sociometric ID (sID) for the user, as shown in block 323. Additional details of how this sID is generated are described below.

Figure 4:
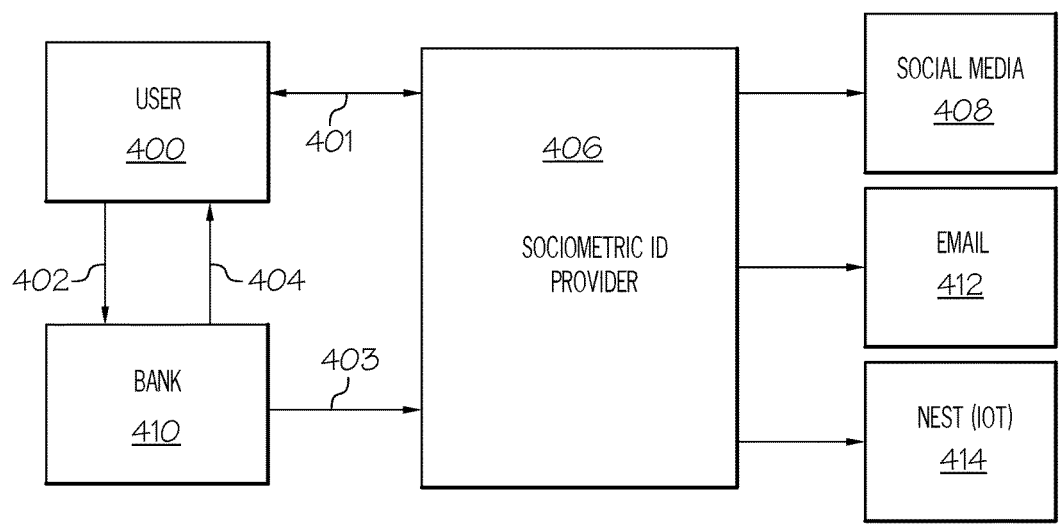
FIG. 4 illustrates an overview of how sociometric identification documents (sIDs) are used to identify a user in accordance with one or more embodiments of the present invention.

With reference now to FIG. 4, an overview of how sociometric IDs are used to identify a user is presented.

Assume that a user is represented by the block showing user 400. As shown in line 401, the user first obtains a sociometric ID specific for that user from a sociometric ID provider 406 (e.g., a server, database, etc. that stores sociometric IDs). That is, sociometric ID provider 406 is an exemplary identity providing server that performs one or more of the processes/steps described herein. In one or more embodiments of the present invention, the user will not know initially what his/her sociometric ID is. Therefore, the sociometric ID provider 406 will refer to a lookup table to match a non-sociometric ID (e.g., a first name and last name of the user, an email address of the user, etc.) to the sociometric ID (that was generated using the process introduced above in FIG. 3).

As shown in line 402, the sociometric ID retrieved by the user 400 (see line 401) is provided to a bank 410, as shown in line 402. The bank then connects to the sociometric ID provider 406 (as shown by line 403) or directly (as not shown) to one or more of the provider entities, such as social media 408 (e.g., a social media service that provides information about the social connections and interactions described in block 208 shown in FIG. 2), email 412 (e.g., an email server that provides email information about the user's email activity described in block 212 shown in FIG. 2), and/or IoT nest 414 (e.g., a network of intercommunicating devices (IoT) that provide information about how the user interacts with such devices as described in block 214 shown in FIG. 2).

In one or more embodiments of the present invention, the sociometric ID provider 406 is a computer (e.g., sociometric ID provider 106 shown in FIG. 1) that generates initial versions of the sociometric ID (sID) based on a user's interactions with the provider entities (e.g., provider entities 315 shown in FIG. 3 and/or elements 408, 412, and/or 414 shown in FIG. 4). Likewise, sociometric ID provider 406 also updates the sID based on subsequent user interactions with the provider entities.

Assume that the bank 410 is communicating with sociometric ID provider 406 as depicted by line 403. If the bank 410 mentions in the communication that part of the sociometric ID has been derived from activities with social media 408, then the sociometric ID provider 406 will connect the user 400 to social media 408, since that sociometric ID is tailored for communications with social media 408. That is, since the sociometric ID is derived from past interactions with social media 408, then user 400 and social media 408 have "a history with one another", and so sociometric ID provider 406 will enable a session between user 400 (and/or bank 410) and social media 408 to occur.

In one or more embodiments in which bank 410 and sociometric ID provider 406 act as intermediaries between user 400 and social media 408, email 412, and/or nest (IoT) 414, bank 410 will verify user 400's preliminary ID by asking a security question, asking for a password, etc., as depicted in line 404.

The elements in FIG. 4 may be considered graph nodes. For purposes of clarity, some of the nodes shown in FIG. 4 are expressly depicted in the interaction graph 501 that is constructed and shown in FIG. 5.

Figure 5:
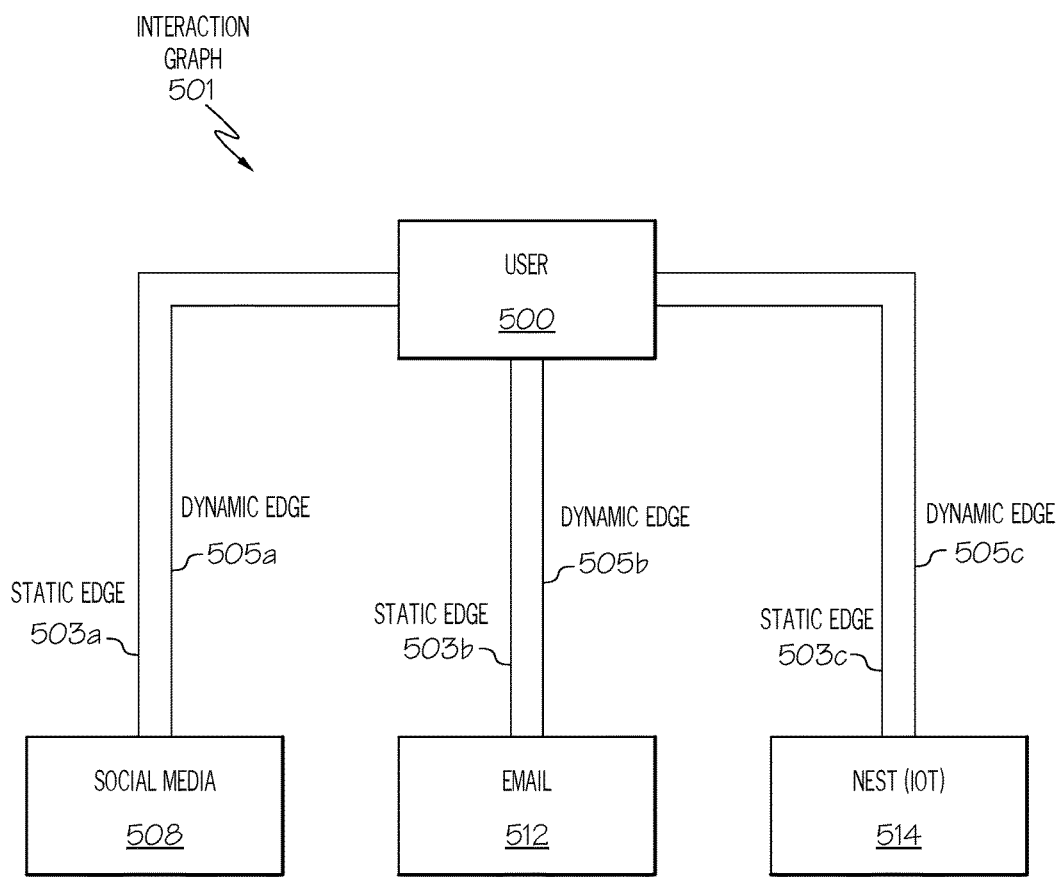
FIG. 5 depicts an exemplary interaction graph that includes a user node and one or more provider entity nodes in accordance with one or more embodiments of the present invention.

As shown in FIG. 5, user node 500 (for user 400 shown in FIG. 4) is connected to a social media node 508 (for the social media 408 described in FIG. 4), an email node 512 (for the email 412 described in FIG. 4), and a nest (IoT) node 514 (analogous to nest (IoT) 414 shown in FIG. 4). Each connection includes a static edge (from static edges 503a-503c) and a dynamic edge (from dynamic edges 505a-505c). These static edges and dynamic edges are not only represented in the interaction graph 501, but are also identified (e.g., in communication packet headers) between the user device (e.g., computer 101 shown in FIG. 1) and other systems (e.g., other systems 155 shown in FIG. 1) that are used by the various provider entities.

The static edges 503a-503c include static metadata that describes a relationship between the user node 500 and the one or more provider entity nodes. For example, static edge 503a may simply state that user 500 is a member of the group of persons who make up the social media network depicted as social media 508.

Dynamic edges 505a-505c describe actions and interactions between the user 500 and the one or more provider entities. For example, dynamic edge 505a may describe how often user 500 accesses the social media 508, what types of actions are performed by user 500 (e.g., if social media 508 advertises a service, does user 500 ever purchase such a service from social media 508), etc.

Figure 6:
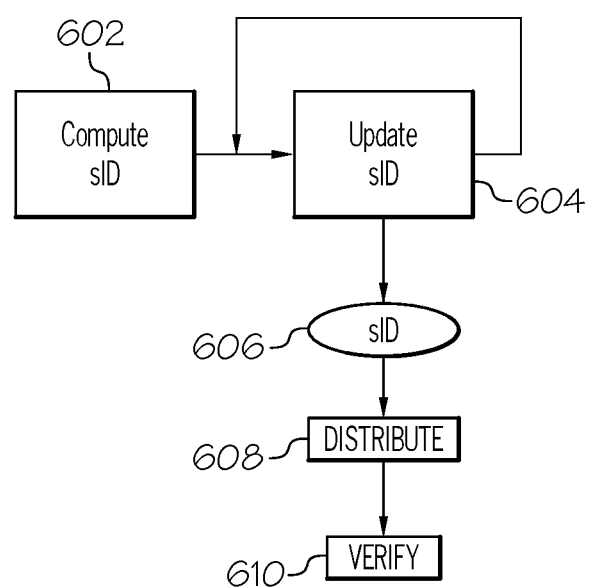
FIG. 6 is a high-level flowchart depicting how sociometric IDs (sIDs) are computed, updated, distributed, and verified in accordance with one or more embodiments of the present invention.

With reference now to FIG. 6, flowchart 600 depicts an overview of how sociometric IDs (sIDs) are computed, updated, distributed, and verified.

As shown in block 602, the sID is initially created (e.g., by sociometric ID provider 406 shown in FIG. 4) from information derived from a user's interactions and actions with various provider entities, as described in FIG. 2-FIG. 5 and/or other figures herein.

As depicted in block 604, the sID is updated (e.g., by sociometric ID provider 406 shown in FIG. 4) according to interactions and actions with the various provider entities subsequent to the initial sID's creation. This updated sID 606 is then distributed (e.g., to the bank 410 shown in FIG. 4), as depicted in block 608. As described in FIG. 4, the sID and/or the user's initial ID (e.g., name, password, etc.) may also be verified (block 610) by the sociometric ID provider 406 shown in FIG. 4.

Figure 7:
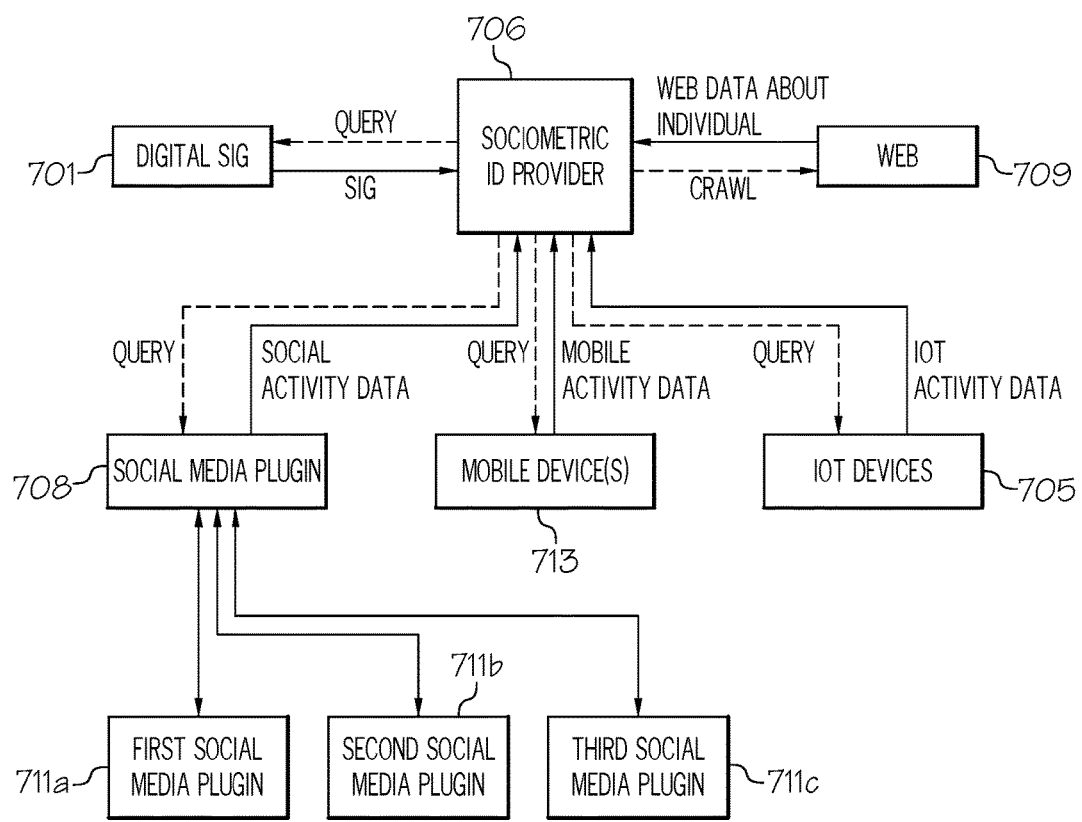
FIG. 7 illustrates a sociometric ID provider obtaining information about a user for use in generating a sociometric ID in accordance with one or more embodiments of the present invention.

As shown in FIG. 7, information about a user's interactions is obtained by a sociometric ID provider 706 (analogous to the sociometric ID provider 406 shown in FIG. 4).

For example, sociometric ID provider 706 may send a query asking for a digital signature 701 from a user. This signature is returned, and is used 1) as a starting element for creating the sID described herein, and 2) as an ID used to request the sociometric identification document (sID) from the sociometric ID provider 706.

Other activity shown in FIG. 7 is obtained by the sociometric ID provider 706 to generate the sID. For example, the sociometric ID provider 706 may query a social media plugin 708 (that supports social media 408 shown in FIG. 4) for a history of the user interacting with one or more social media services, including those accessed by first social media plugin 711a, second social media plugin 711b, and/or third social media plugin 711c (i.e., social media plugin 708 acts as an intermediary to first social media plugin 711a, second social media plugin 711b, and/or third social media plugin 711c).

Similarly, sociometric ID provider 706 may query mobile device(s) 713 (analogous to mobile device(s) 313 described in FIG. 3) for mobile activity data that describes the user's use of mobile devices.

Similarly, sociometric ID provider 706 may query IoT devices (analogous to IoT 305 described in FIG. 3) for a record of the user's activity/interaction with the IoT.

Similarly, sociometric ID provider 706 may crawl the web 709 (in order to obtain the web footprint 309 described in FIG. 3), thus obtaining web data about the user.

Figure 8:
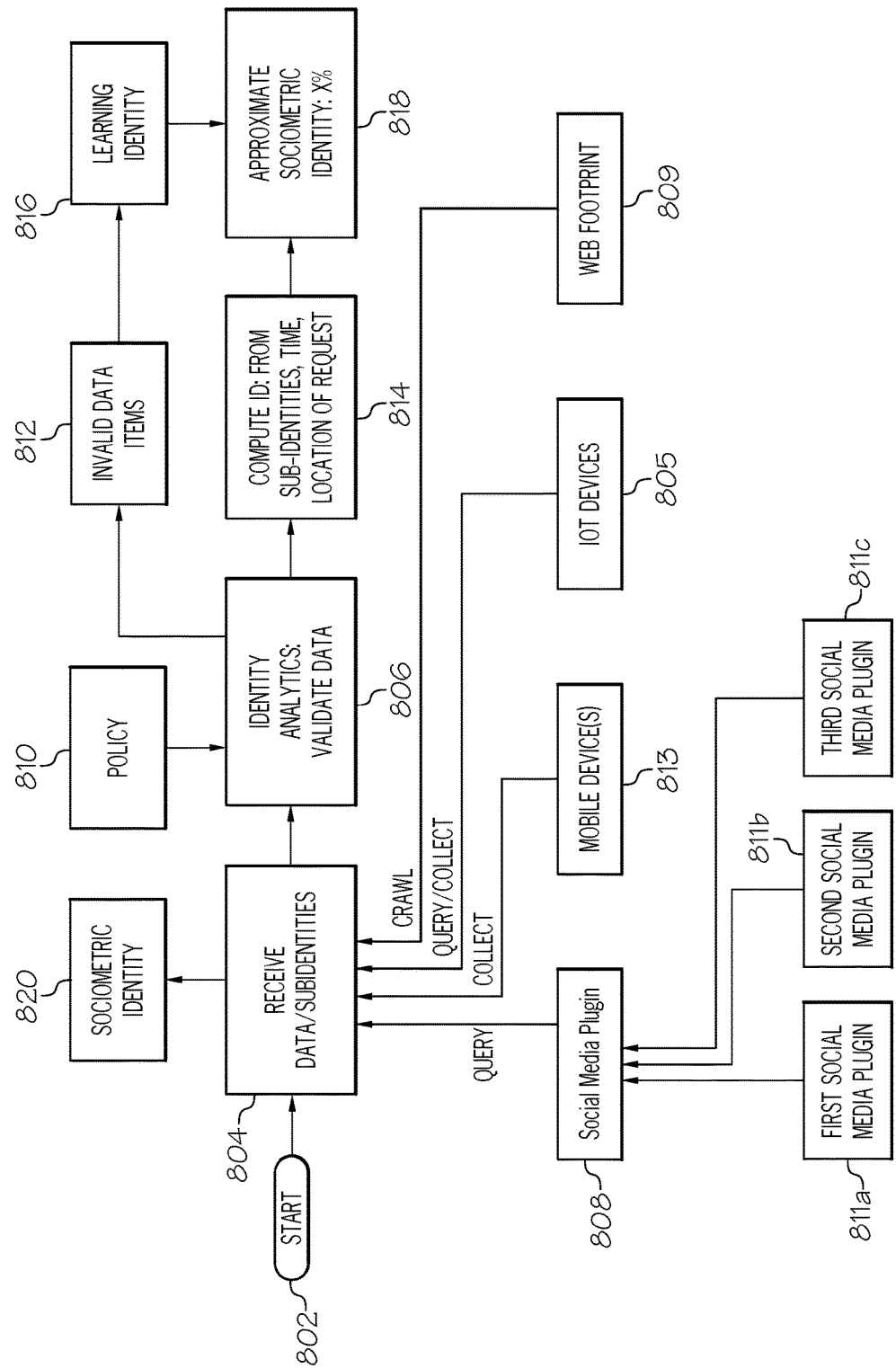
FIG. 8 depicts a method for computing a sociometric ID in accordance with one or more embodiments of the present invention.

With reference now to FIG. 8, a flowchart depicting a method for computing a sociometric ID in accordance with one or more embodiments of the present invention is presented.

After initiator block 802, a system (e.g., sociometric ID provider 402 introduced in FIG. 4) receives data and sub-identities (e.g., signatures, personal names, etc.) about a particular user, as described in block 804. The sociometric ID provider also receives data describing the user from provider entities. Exemplary provider entities include social media 808 (analogous to the social media supported by the social media plugin 708 shown in FIG. 7) as well as first social media 811a (supported by the first social media plugin 711a depicted in FIG. 7), second social media 811b (supported by the second social media plugin 711b depicted in FIG. 7), and third social media 811c (supported by the third social media plugin 711c depicted in FIG. 7). Other provider entities include mobile device(s) 813 (analogous to mobile device(s) 713 shown in FIG. 7); IoT 805 (analogous to IoT devices 705 shown in FIG. 7); and web footprint 809 (i.e., a footprint created by the user browsing on the web 709 shown in FIG. 7).

As described in block 806, the sociometric ID provider 402 then validates the initial ID from the user and the information collected from the provider entities according to a policy 810. For example, policy 810 may state that any data from the provider entities that cannot be verified will be deleted from the process, and send to invalid data items 812 (i.e., data that will not be used to construct the sID).

Similarly, policy 810 may state that if a validation error is above a certain level (e.g., Y %), then the identity has a confidence value<1. For example, if less than 90% (Y %) of the data received from the provider entities is verified as being accurate (i.e., with regard to the user's interaction with the provider entities), then the entire sID is suspect, and is labeled as such for future warning to system resources that are relying on the sID as authorization to access the system resources. Thus, the policy 810 defines invalid data items, or properties of data items that should be treated as valid. For example, if the data contains multiple locations of a single individual at a given time, then some or all of the data may not belong to the individual claimed, and is therefore treated as being invalid. Similarly, if the data contains different social security numbers, then the data will be treated as invalid.

In one or more embodiments, data retrieved from the provider entities, as well as the sID itself, may be stored at the provider entities in an encrypted form, in order to preserve the security of the sID.

As shown in block 814, an initial sID is computed from sub-identities (e.g., groups of nodes in the interaction graph 501 shown in FIG. 5), the time that interactions occurred between the user and the provider entities, the location of the user when requesting access to a computer resource (which may or may not be one of the provider entities), etc.

As shown in block 816, the system may heuristically learn to reject the invalid data items 812 in order to create an approximate sID, as depicted in block 818. That is, if 20% of the data from the provider entities is rejected (due to not passing the data inspection described in block 806), then it is an approximation sID, which may or may not be used.

However, if sufficient data is received from the provider entities (e.g., 95% is deemed accurate), then an uncompromised sID 820 is generated.

Figure 9:
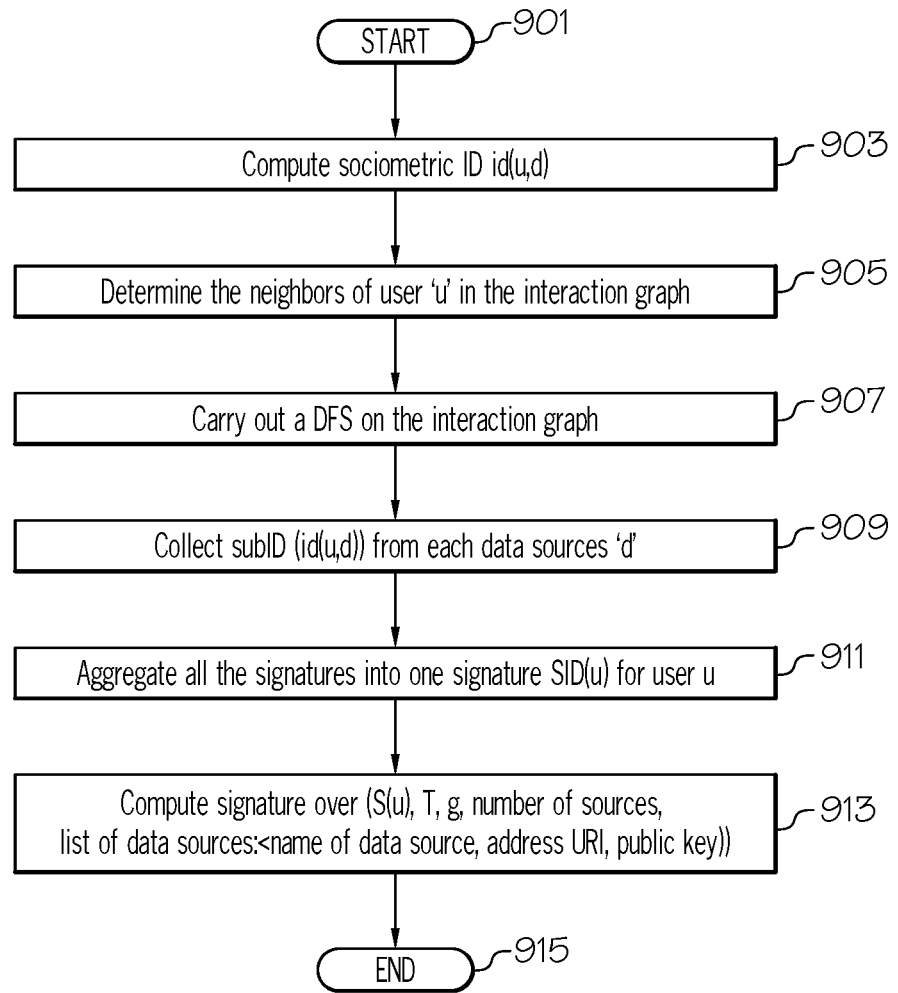
FIG. 9 is a high-level flow chart of one or more steps performed by one or more processors to computer a sociometric identification document (sID) in accordance with one or more embodiments of the present invention.

With reference now to FIG. 9, a high-level flow chart of one or more steps performed by one or more processors to compute a sociometric identification document (sID) in accordance with one or more embodiments of the present invention is provided.

The process begins at initiator block 901 by computing a sub-identity for a user "u" according to each provider entity (e.g., see FIG. 3) accessed by that user.

As described in block 903, if this is the first time the sID is being computed, the sociometric ID id(u,d) is generated from the static profile of the user "u" and other personal information/biometrics provided for the user "u" for each provider entity "d". The initial sID may be generated by hashing or by signing such data to create the initial sID.

As described in block 905, neighbors (e.g., nodes 508, 512, 514 in interaction graph 501 shown in FIG. 5) of the user node (e.g., node 500) are identified.

As described in block 907, a depth-first search (DFS) is used to traverse through the interaction graph. In one or more embodiments, the DFS is performed in a recursive/reproducible manner such as by visiting with an unvisited neighbor that joined the network earliest. The sociometric ID of the user is appended to each neighbor node of the user node. All of these sIDs ('id(u,d)') for the neighbor nodes are hashed. Their hashed value is then assigned to the hashed/assimilated sID, as described in blocks 909-911. Another embodiment may include a different method, such as computing a digital signature of the appended values, or aggregating the digital signatures.

Thus, when the DFS ends, id(u, d)=hash(id (u, d)||interactions||meta-data). That is, the sIDs (id (u, d)) for each subunit (neighbor nodes "d" to the user node "u") are hashed with the interactions (as described in the static and dynamic edges depicted in FIG. 5) and the meta-data derived from these edges.

In one or more embodiments of the present invention, a timestamp T is also incorporated into the sID, in order to define the lifetime of the sID. Thus, the sID (u, T, g) is computed for the user S(u), according to the timestamp describing when the user interacted with the various provider entities, each for sub-graph g from the interaction graph, and/or any uniform resource identifiers (URIs) and/or cryptograph keys (e.g., public key) associated with provider entities. Thus, as described in block 913, the sID is computed over (S(u), T, g, number of sources, list of data sources:<name of data source, address URI, public key). If some or all signatures S(d) are non-aggregate signatures or are hashes, then sID(u, T, g) is computed based on (T, number of sources, hash-after-concatenate-over-all-d(S(d), name of data source 'd', address URI)).

Figure 10:
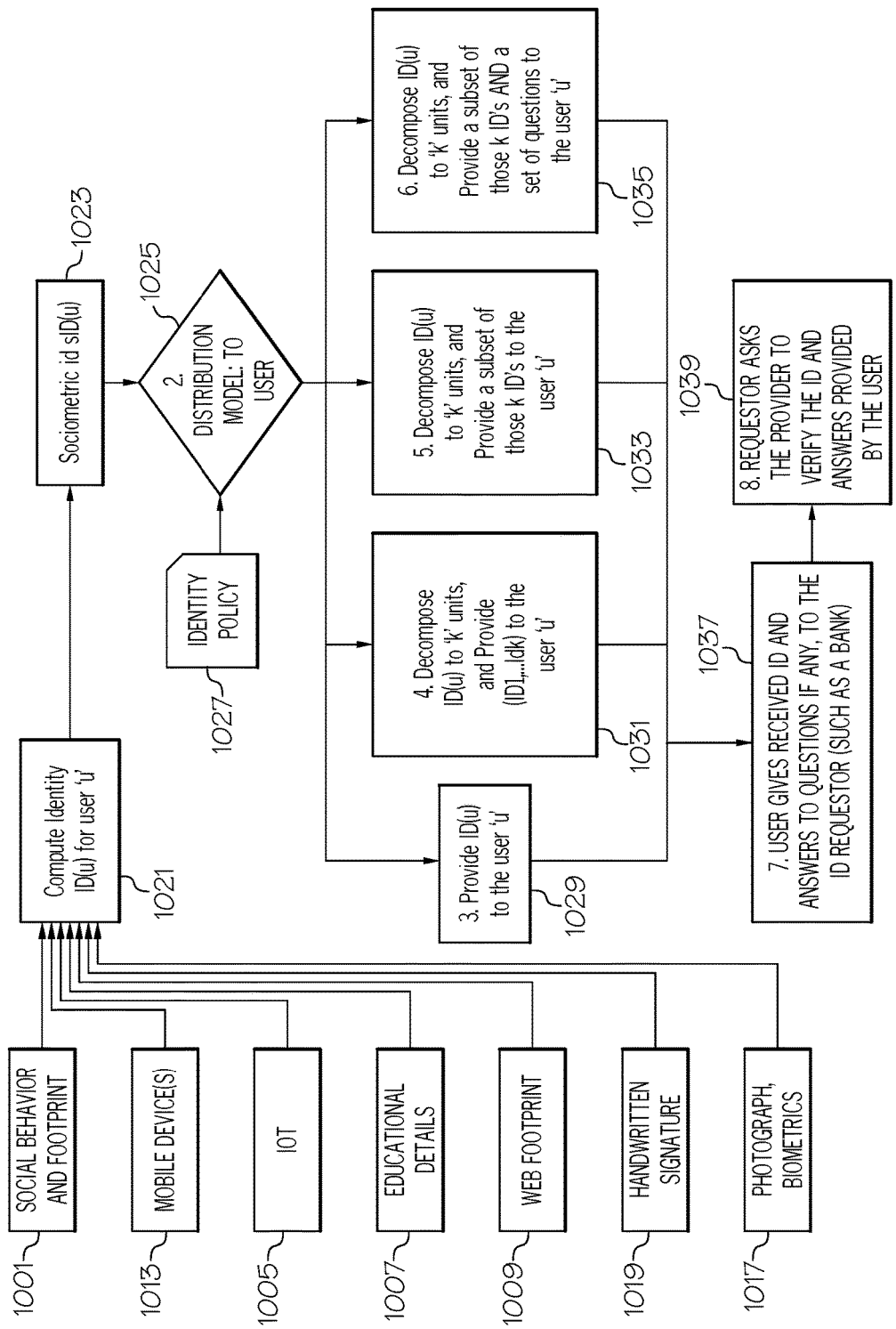
FIG. 10 is a high level flow chart of a process for computing, distributing, and verifying an sID in accordance with one or more embodiments of the present invention.

With reference now to FIG. 10, a high level flow chart of a process for computing, distributing, and verifying an sID in accordance with one or more embodiments of the present invention is presented.

As in FIG. 3, the system computes the initial ID(u) for the user (block 1021) using information from social behavior and footprint 1001, mobile device(s) 1013, IoT 1005, educational details 1007, web footprint 1009, handwritten signature 1019, and photograph, biometrics 1017. The system then generates the sID, as shown in block 1023.

As shown in block 1025, the system then distributes the sID to the user according to an identity policy 1027. There are multiple modes of distribution of sIDs: to a consumer of the sID, to a service provider, etc.

In one or more embodiments of the present invention, signatures (S(d)) are collected from each of the data sources 'd' (i.e., the provider entities described herein). If all the signatures S(d) are computed using an aggregate signature scheme, then the system will aggregate all the signatures into one signature S(u) for user u. A timestamp T (e.g., a particular period of time) is the time at which the following step is carried out:

sID(u,T)←Signature-of-(S(u), T, number of sources, list of data sources:<name of data source, address URI, public key))

If some or all signatures S(d) are non-aggregate signatures or are hashes, then:

sID(u,T)←Signature-of-(T, number of sources, hash-after-concatenate-over-all-d(S(d), name of data source 'd', address URI))

Thus, as shown in block 1029 in FIG. 10, the ID(u) (i.e., the sID for the user) is provided to the user.

As described in block 1031, the ID(u) is then decomposed into "k" units for each of the provider entities. As described in block 1033, only a subset of these "k" units may be sent to the user, depending on the user's history, requests, etc.

As described in block 1035, a set of questions may also be sent to the user in order to verify the sID. For example, assume that the user claimed 1) a certain level of education at 2) a particular university and 3) he/she is connected to a certain person on a social media website. The sociometric system computes a digest of these three claimed facts and verifies the stored digests against these facts. If the digests are matched, then the identity is verified, as described in blocks 1037-1039 in FIG. 10.

As described herein in various embodiments of the present invention, a user authenticates on an application (e.g., webpage/portal, mobile app) for sociometric identity. The user may begin by selecting "create identity" on a user interface, and then selects the "data sources" (e.g., provider entities) from which data would be used to create the identity, such as "all data sources", or a subset of data sources such as certain social media services, certain websites, particular mobile devices, etc.

The system then determines (from an input from the user or from an 'identity policy') if the user has a cryptographic key for digital signature, and credentials to protect the key (e.g., passwords, biometrics, multi-factor credentials or other credentials). Credentials and keys are managed by a "Credentials and key management unit".

If there is no key, the user is asked to confirm that a new key (i.e., an sID) will be generated.

If the key has expired or needs to be changed based on a credentials policy, the application asks the user to confirm re-generation of the key.

The application asks the user to select from the following two techniques: 1) the application will pull data from the "data sources", and/or 2) the application will receive "hashes" or "signatures" of the data of the user from the "data sources" selected by the user or from other data sources.

The application then uses an "identity generation component" to generate the identity bitstring (the sID) for the user. The application stores the sID in the database.

The application reads the 'identity policy' and determines whether to distribute relevant sub-identities to each relevant data source. If sub-identities are to be distributed to some or all of the data sources, then for each data source DS, a "sub-identity generator" component generates the sub-identities, which are sent to the respective data sources.

Figure 11:
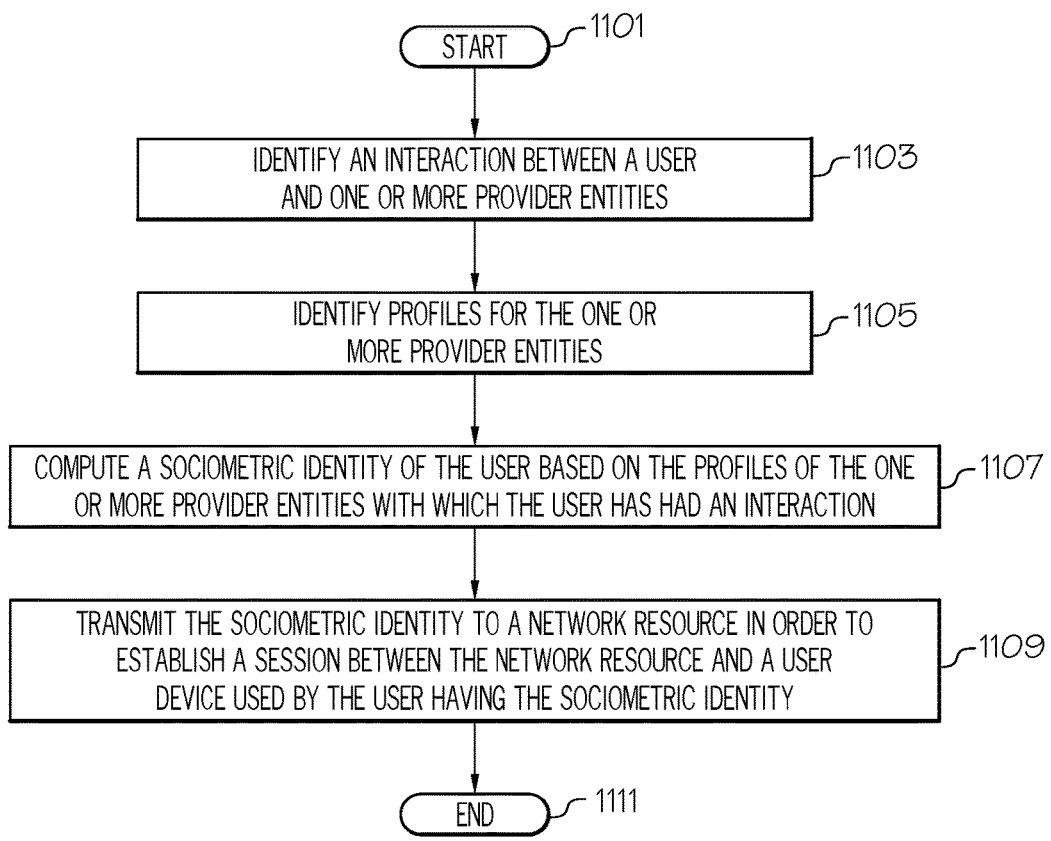
FIG. 11 is a high level flow chart of one or more steps performed by one or more embodiments of the present invention to generate and utilize an sID.

With reference now to FIG. 11, a high level flow chart of one or more steps performed by one or more embodiments of the present invention to generate and utilize an sID is presented.

After initiator block 1101, one or more processors (e.g., within sociometric ID provider 406) identify an interaction between a user and one or more provider entities, as described in block 1103. Examples of such provider entities are shown in FIG. 3, FIG. 10, etc.

As described in block 1105, the one or more processors identify profiles for the one or more provider entities. For example, the profile of IoT 305 in FIG. 3 is that of a group of devices that are able to communicate with one another regarding their current states. Similarly, the profile of the browser that provided the web footprint 309 is that of a device that is able to both crawl and keep a record of crawls through the World Wide Web. Similarly, the profile of a travel agency or provider that provided the transportation/travel footprint 303 is that of a system that is able to both make travel reservations and keep a record of travel. That is, in one or more embodiments, a provider entity may provide information that is specific to/for the user. Thus, the profiles for the one or more provider entities may identify both the nature of the type of information/service/resources provided by the provider entities, as well as a record of the user's interactions with the provider entities.

As described in block 1107, the one or more processors then compute a sociometric identity (sID) of the user based on the profiles of the one or more provider entities with which the user has had an interaction. That is, the sID essentially says "User A is a user who has visited these websites, while using this mobile device, and has gone to a certain university". That is, the sID describes what the user has done.

Once the sID is generated for use for one or more particular computer resources (e.g., servers, storage devices, printers, and/or one or more of the provider entities that were used to generate the sID), the one or more processors then transmit the sociometric identity to a network resource in order to establish a session between the network resource and a user device used by the user having the sociometric identity, as described in block 1109. That is, the sID is then used to verify the identity of the person attempting to re-access the provider entities (or even another computer system that is different from the provider entities) is whom the user says he/she is.

The flowchart ends at terminator block 1111.

In one or more embodiments of the present invention, one or more processors identify a time period in which the interaction between the user and the provider entity(ies) occurred. This time period may be a particular period of time (e.g., from January 2020 through December 2020), or it may be a length of time (e.g., 30 days, regardless of the dates that these 30 days occurred in). The processor(s) then limit a lifetime of the sociometric identity based on the time period in which the interaction occurred. For example, if the user has a history of accessing a particular website during the past year, then the sID used to re-access that website may be perishable, such that it can only be used for the next month.

In one or more embodiments of the present invention, one or more processors recursively examine the profiles for the one or more provider entities until the sociometric identifier is confirmed for the user. For example, assume that the sID described herein was based on a user accessing a certain website. Assume now that the system wants to bolster the sID based on the user visiting other websites. If the user visited enough websites, then that user is confirmed as a routine visitor to websites, and his/her sID is confirmed as that of a website visitor.

In one or more embodiments of the present invention, one or more processors construct an interaction graph, such as the interaction graph 501 shown in FIG. 5. As described herein, the interaction graph includes a user node 500 for the user linked to provider entity nodes (508, 512, 514) for the one or more provider entities. As depicted in FIG. 5, the user node and the one or more provider entity nodes are connected by pairs of static edges 503a-503c and dynamic edges 505a-505c. The static edges include static metadata that describes a relationship between the user node and the one or more provider entity nodes, and the dynamic edges include dynamic metadata that describes actions and interactions between the user and the one or more provider entities. The one or more processors then perform a depth-first search of the interaction graph in order to traverse all nodes on the interaction graph. Thereafter, the one or more processors hash the sociometric identity (sID) with the static metadata and the dynamic metadata for all nodes on the interaction graph in order to create a sociometric identity hash value. The sociometric identity hash value identifies a location in a sociometric identity table at which the sociometric identity of the user is to be stored. The one or more processors then store the sociometric identity of the user at the location in the sociometric identity table, for quick and efficient future retrieval.

In one or more embodiments, the interaction graph is partitioned, by one or more processors, into multiple digests. For example, a first digest includes the user node and a first set of provider entity nodes, and a second digest may include the user node and a second set of provider entity nodes. One or more processors then compare the first digest to the second digest, in order to determine a percentage of matching static and dynamic metadata between the first digest and the second digest. In response to the percentage of matching static and dynamic metadata between the first digest and the second digest exceeding a predefined value, then the processors confirm the sociometric identity of the user as a confirmed sociometric identity of the user. That is, if the static/dynamic edges between the user node and multiple provider entity nodes match, then the sID is confirmed as being based on accurate and meaningful data regarding the relationship between the user and the provider entities. The processors then store the sociometric identity of the user in a digest store, which utilizes a key value pair table to associate the confirmed sociometric identity of the user with the first digest. That is, the system can then quickly retrieve the sID when the user desires to re-access the provider entity found in the first digest (partition) depicted in the interaction graph.

In various embodiments of the present invention, at least one of the provider entities is a social network provider; at least one of the provider entities is an Internet of Things (IoT) record server; etc.

In various embodiments of the present invention, the interaction between the user and the one or more provider entities is a social connection of the user and another user; a purchase of a product from a provider; a purchase of a service from a provider; and/or emails exchanged by the user with other email users.

In one or more embodiments of the present invention, one or more processors store and retrieve sIDs using a hash of an interaction triplet in order to expedite and make more efficient retrieval of the sIDs. That is, one or more processors create a hash of an interaction triplet for the interaction between the user and the one or more provider entities, where the hash is a hashing of a name of the user, a subject of the interaction with the one of more provider entities, and a date of the interaction with the one or more provider entities. The one or more processors then store the hash in a table of hashed interaction triplets for future retrieval of a hashed interaction triplet for the user in response to the user requesting access to the network resource. That is, the hashed interaction triplet provides a pointer to the sID needed to access that particular network resource.

In one or more embodiments of the present invention, the method(s) described herein are implemented as a cloud-based service (described below).

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
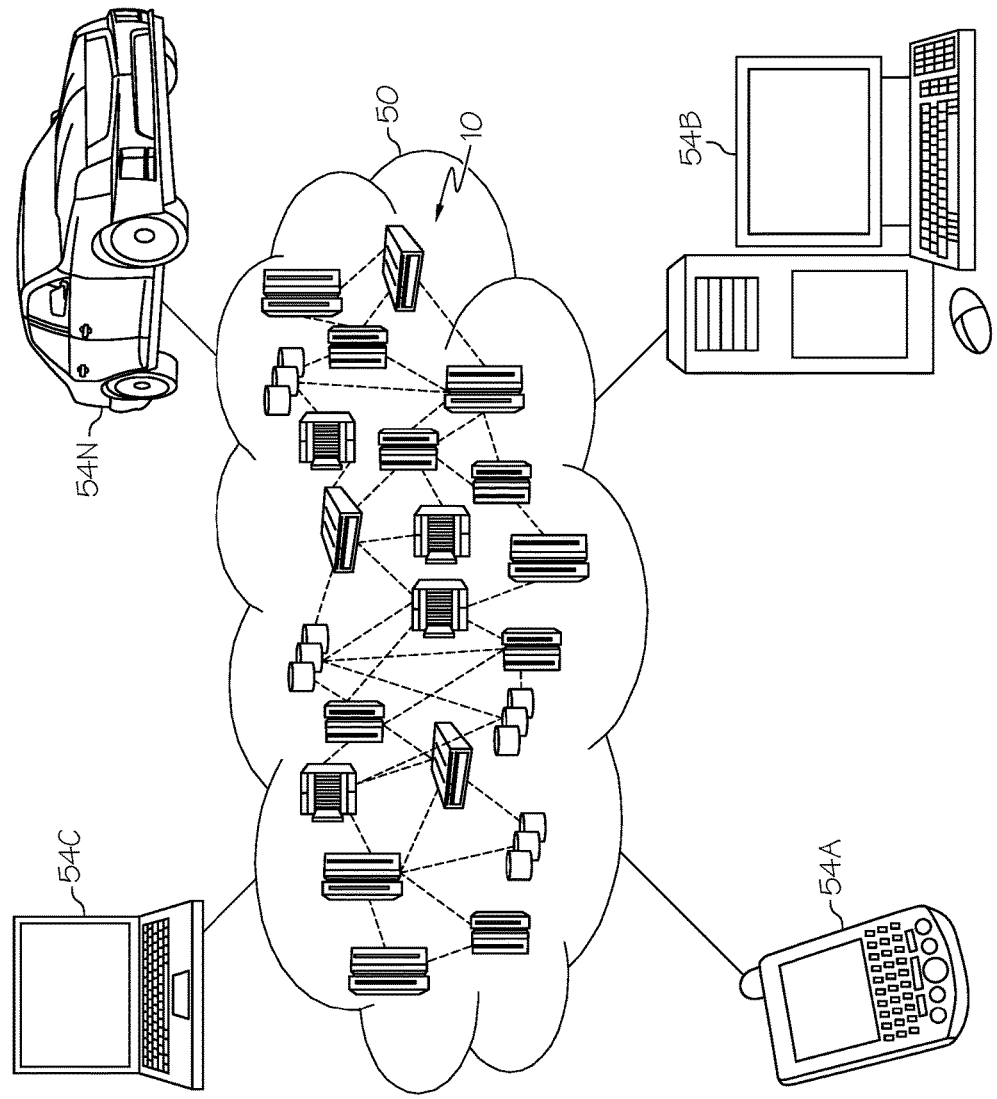
FIG. 12 depicts a cloud computing environment according to an embodiment of the present invention.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 12 are intended to be illustrative only and that computing nodes 10 and cloud computing environment 50 can communicate with any type of computerized device over any type of network and/or network addressable connection (e.g., using a web browser).

Figure 13:
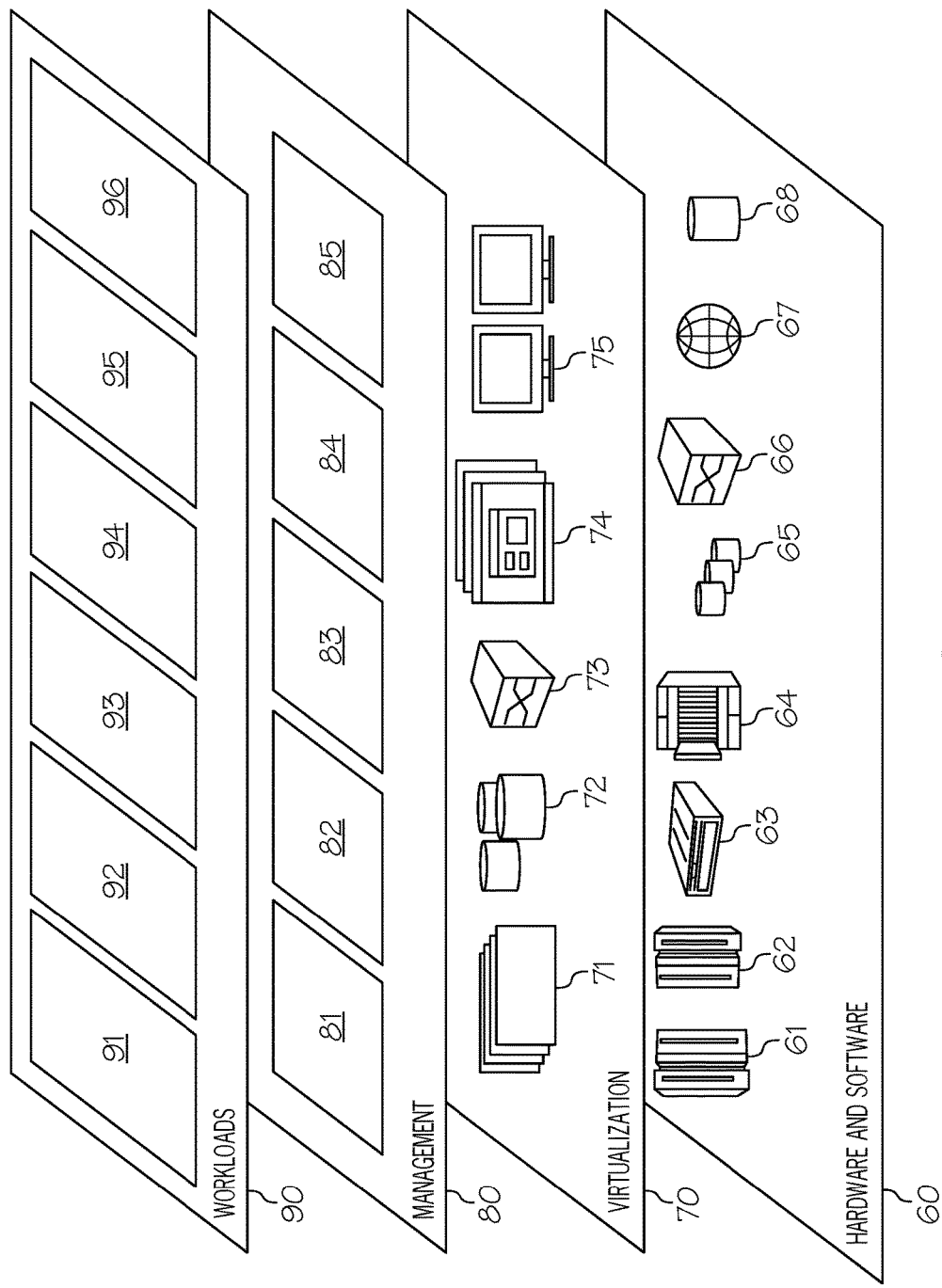
FIG. 13 depicts abstraction model layers of a cloud computing environment according to an embodiment of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and device session management 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   identifying, by one or more processors, an interaction between a user and one or more provider entities;
   identifying, by one or more processors, profiles for the one or more provider entities, wherein each profile of the one or more provider entities describes a type of resource provided by a respective provider entity of the one or more provider entities;
   computing, by one or more processors, a sociometric identity of the user based on the profiles for the one or more provider entities with which the user has had an interaction; and
   transmitting, by one or more processors, the sociometric identity to a network resource in order to establish a session between the network resource and a user device used by the user having the sociometric identity.

2. The method of claim 1, further comprising:
   identifying, by one or more processors, a time period in which the interaction occurred, wherein the time period identifies a particular period of time; and
   limiting, by one or more processors, a lifetime of the sociometric identity based on the time period in which the interaction occurred.

3. The method of claim 1, further comprising:
   identifying, by one or more processors, a length of time during which the interaction occurred, wherein the length of time is not restricted to any particular period of time; and
   limiting, by one or more processors, a lifetime of the sociometric identity based on the length of time during which the interaction occurred.

4. The method of claim 1, further comprising:
   recursively examining, by one or more processors, the profiles for the one or more provider entities until the sociometric identity is confirmed for the user.

5. The method of claim 1, further comprising:
   constructing, by one or more processors, an interaction graph, wherein the interaction graph comprises a user node for the user linked to one or more provider entity nodes for the one or more provider entities, wherein the user node and the one or more provider entity nodes are connected by pairs of static edges and dynamic edges, wherein the static edges include static metadata that describes a relationship between the user node and the one or more provider entity nodes, and wherein the dynamic edges include dynamic metadata that describes actions and interactions between the user and the one or more provider entities;

performing, by one or more processors, a depth-first search of the interaction graph in order to traverse all nodes on the interaction graph;

hashing, by one or more processors, the sociometric identity with the static metadata and the dynamic metadata for all nodes on the interaction graph in order to create a sociometric identity hash value, wherein the sociometric identity hash value identifies a location in a sociometric identity table at which the sociometric identity of the user is to be stored; and storing, by one or more processors, the sociometric identity of the user at the location in the sociometric identity table.

6. The method of claim 1, wherein at least one of the provider entities is a social network provider.

7. The method of claim 1, wherein at least one of the provider entities is an Internet of Things (IoT) record server.

8. The method of claim 1, wherein the interaction is a social connection of the user and another user.

9. The method of claim 1, wherein the interaction is a purchase of a product from a provider.

10. The method of claim 1, wherein the interaction is a purchase of a service from a provider.

11. The method of claim 1, wherein the interaction is described in a list of emails exchanged by the user.

12. The method of claim 1, further comprising:
creating, by one or more processors, a hash of an interaction triplet for the interaction between the user and the one or more provider entities, wherein the hash is a hashing of a name of the user, a subject of the interaction with the one or more provider entities, and a date of the interaction with the one or more provider entities;
storing, by one or more processors, the hash in a table of hashed interaction triplets; and
retrieving, by one or more processors, a hashed interaction triplet for the user in response to the user requesting access to the network resource.

13. The method of claim 1, further comprising:
constructing, by one or more processors, an interaction graph, wherein the interaction graph comprises a user node for the user linked to one or more provider entity nodes for the one or more provider entities, wherein the user node and the one or more provider entity nodes are connected by pairs of static edges and dynamic edges, wherein the static edges include static metadata that describes a relationship between the user node and the one or more provider entity nodes, and wherein the dynamic edges include dynamic metadata that describes actions and interactions between the user and the one or more provider entities;
partitioning, by one or more processors, the interaction graph into multiple digests, wherein a first digest comprises the user node and a first set of provider entity nodes, and wherein a second digest comprises the user node and a second set of provider entity nodes;
comparing, by one or more processors, the first digest to the second digest, wherein comparing the first digest to the second digest determines a percentage of matching static and dynamic metadata between the first digest and the second digest;
in response to the percentage of matching static and dynamic metadata between the first digest and the second digest exceeding a predefined value, confirming, by one or more processors, the sociometric identity of the user as a confirmed sociometric identity of the user; and
storing, by one or more processors, the sociometric identity of the user in a digest store, wherein the digest store utilizes a key value pair table to associate the confirmed sociometric identity of the user with the first digest.

14. The method of claim 1, wherein the sociometric identity is provided by an identity provider server.

15. The method of claim 1, wherein the method is implemented as a cloud-based service.

16. A computer program product comprising one or more non-transitory computer readable storage mediums, and program instructions stored on at least one of the one or more non-transitory computer readable storage mediums, the stored program instructions comprising:
program instructions to identify an interaction between a user and one or more provider entities;
program instructions to identify profiles for the one or more provider entities, wherein each profile of the one or more provider entities describes a type of resource provided by a respective provider entity of the one or more provider entities;
program instructions to compute a sociometric identity of the user based on the profiles of the one or more provider entities with which the user has had an interaction; and
program instructions to transmit the sociometric identity to a network resource in order to establish a session between the network resource and a user device used by the user having the sociometric identity.

17. The computer program product of claim 16, further comprising:
program instructions to identify a length of time during which the interaction occurred, wherein the length of time is not restricted to any particular period of time; and
program instructions to limit a lifetime of the sociometric identity based on the length of time during which the interaction occurred.

18. The computer program product of claim 16, further comprising:
program instructions to construct an interaction graph, wherein the interaction graph comprises a user node for the user linked to one or more provider entity nodes for the one or more provider entities, wherein the user node and the one or more provider entity nodes are connected by pairs of static edges and dynamic edges, wherein the static edges include static metadata that describes a relationship between the user node and the one or more provider entity nodes, and wherein the dynamic edges include dynamic metadata that describes actions and interactions between the user and the one or more provider entities;
program instructions to perform a depth-first search of the interaction graph in order to traverse all nodes in the interaction graph;
program instructions to hash the sociometric identity with the static metadata and the dynamic metadata for all nodes in the interaction graph in order to create a sociometric identity hash value, wherein the sociometric identity hash value identifies a location in a sociometric identity table at which the sociometric identity of the user is to be stored; and program instructions to store the sociometric identity of the user at the location in the sociometric identity table.

19. The computer program product of claim 16, wherein the program instructions are provided as a service in a cloud environment.

20. A system comprising:

one or more processors;

one or more computer readable memories operably coupled to the one or more processors; one or more computer readable storage mediums operably coupled to the one or more computer readable memories; and program instructions stored on at least one of the one or more computer readable storage mediums for execution by at least one of the one or more processors via at least one of the one or more computer readable memories, the program instructions comprising:

program instructions configured to identify an interaction between a user and one or more provider entities;

program instructions configured to identify profiles for the one or more provider entities, wherein each profile of the one or more provider entities describes a type of resource provided by a respective provider entity of the one or more provider entities;

program instructions configured to compute a sociometric identity of the user based on the profiles of the one or more provider entities with which the user has had an interaction; and program instructions configured to transmit the sociometric identity to a network resource in order to establish a session between the network resource and a user device used by the user having the sociometric identity.

* * * * *